(12) United States Patent
Chinya et al.

(10) Patent No.: US 9,383,997 B2
(45) Date of Patent: *Jul. 5, 2016

(54) APPARATUS, SYSTEM, AND METHOD FOR PERSISTENT USER-LEVEL THREAD

(71) Applicant: Intel Corporation, Santa Clara, CA (US)

(72) Inventors: Gautham Chinya, Hillsboro, OR (US); Hong Wang, Santa Clara, CA (US); Prashant Sethi, Folsom, CA (US); Shivnandan Kaushik, Portland, OR (US); Bryant Bigbee, Scottsdale, AZ (US); John Shen, San Jose, CA (US); Richard Hankins, Santa Clara, CA (US); Xiang Zou, Beaverton, OR (US); Baiju V. Patel, Portland, OR (US); Jason W. Brandt, Austin, TX (US); Anil Aggarwal, Portland, OR (US); John L. Reid, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 13/914,830

(22) Filed: Jun. 11, 2013

(65) Prior Publication Data
US 2013/0275735 A1    Oct. 17, 2013

Related U.S. Application Data

(63) Continuation of application No. 13/221,119, filed on Aug. 30, 2011, now Pat. No. 8,479,217, which is a continuation of application No. 11/239,475, filed on Sep. 30, 2005, now Pat. No. 8,028,295.

(51) Int. Cl.
*G06F 9/46* (2006.01)
*G06F 7/38* (2006.01)
(Continued)

(52) U.S. Cl.
CPC ............ *G06F 9/3005* (2013.01); *G06F 9/3009* (2013.01); *G06F 9/3851* (2013.01); *G06F 9/3877* (2013.01); *G06F 9/3885* (2013.01); *G06F 9/461* (2013.01)

(58) Field of Classification Search
None
See application file for complete search history.

(56) References Cited

U.S. PATENT DOCUMENTS 5,872,963 A    2/1999    Bitar et al.
6,189,023 B1   2/2001    Emlich et al.
(Continued)

FOREIGN PATENT DOCUMENTS

CN    1402844 A    3/2003
CN    101038543 B    1/2013

OTHER PUBLICATIONS

Chinese Patent Office, Office Action mailed on Sep. 28, 2014, in Chinese Application No. 201210472991.4.
(Continued)

*Primary Examiner* — Tammy Lee
(74) *Attorney, Agent, or Firm* — Trop, Pruner & Hu, P.C.

(57) ABSTRACT

Embodiments of the invention provide a method of creating, based on an operating-system-scheduled thread running on an operating-system-visible sequencer and using an instruction set extension, a persistent user-level thread to run on an operating-system-sequestered sequencer independently of context switch activities on the operating-system-scheduled thread. The operating-system-scheduled thread and the persistent user-level thread may share a common virtual address space. Embodiments of the invention may also provide a method of causing a service thread running on an additional operating-system-visible sequencer to provide operating system services to the persistent user-level thread. Embodiments of the invention may further provide apparatus, system, and machine-readable medium thereof.

20 Claims, 9 Drawing Sheets

(51) Int. Cl.
*G06F 9/30* (2006.01)
*G06F 9/38* (2006.01)

(56) References Cited

U.S. PATENT DOCUMENTS

| | | |
|---|---|---|
| 6,366,946 B1 | 4/2002 | Christensen |
| 6,675,191 B1 | 1/2004 | Ito |
| 7,360,223 B2 | 4/2008 | Durai |
| 2003/0191730 A1 | 10/2003 | Adkins et al. |
| 2004/0128670 A1 | 7/2004 | Robinson et al. |
| 2004/0215987 A1* | 10/2004 | Farkas et al. ............... 713/300 |
| 2004/0237064 A1 | 11/2004 | Liu et al. |
| 2005/0076186 A1 | 4/2005 | Traut |
| 2005/0223382 A1* | 10/2005 | Lippett ....................... 718/103 |
| 2006/0085368 A1 | 4/2006 | Moilanen et al. |

OTHER PUBLICATIONS

Chinese State Intellectual Property Office, Office Action mailed Oct. 14, 2011 in Chinese application No. 200610144490.8.

* cited by examiner

APPARATUS, SYSTEM, AND METHOD FOR PERSISTENT USER-LEVEL THREAD

This application is a continuation of U.S. patent application Ser. No. 13/221,119, filed Aug. 30, 2011, which is a continuation of U.S. patent application Ser. No. 11/239,475, filed Sep. 30, 2005, now U.S. Pat. No. 8,028,295, issued Sep. 27, 2011, the content of which is hereby incorporated by reference.

BACKGROUND

In a multi-sequencer computer system or computer platform, technical as well as economic constraints may justify an asymmetric organization of specialized computing resources or processors or processing units. In this application, a processor or processing unit may also be referred to, hereinafter, as a sequencer or a processing core. In general, an operating system may not scale well on a computer platform having implemented a large number of sequencers. In particular, the operating system may not be able to handle an asymmetric organization of multiple sequencers efficiently.

The organization of a computer platform may be asymmetric with regard to the types of sequencer's that the platform has implemented. For example, there may be sequencers that are "visible" to the operating system (OS), referred to herein as OS-visible sequencers, and are managed by OS kernels. The OS kernels may be able to control the privilege states of OS-visible sequencers and to provide exception handlers to process interrupts and/or exceptions during execution of threads by the OS-visible sequencers. On the other hand, there may be sequencers that are "invisible" to the OS, referred to herein as OS-sequestered sequencers. OS-sequestered sequencers may not execute operating system codes and may be managed by a sequencer manager.

Recently, a multi-sequencer multiple-instruction-flow-multiple-data flow (MIMI)) ISA (Instruction Set Architecture) extension has been proposed that defines a set of instructions allowing OS-sequestered sequencers to be treated as ting-3 user-level architectural resources for concurrent execution of multiple user-level threads in the single OS thread context. Therefore, OS-sequestered sequencers become available to user-level applications. By using the user-level multi-sequencer MIMI ISA extension, an application thread running on an OS-visible sequencer may be able to use the additional sequencers which are sequestered from the OS The multi-sequencer MIMD ISA extension allows applications to scale, independent of the OS, for a large number of sequencers by submitting work to sequencers that may or may not be visible to the operating system. In the mean time, the operating system may continue to run on a subset of sequence is that are visible to the OS. The user-level MIMD ISA extension allows execution of user-level threads to run on OS-sequestered sequencers, and the user-level threads may run concurrently with the OS thread that created the user-level threads and tuns on an OS-visible sequencer.

BRIEF DESCRIPTION OF THE DRAWINGS

The invention will be understood and appreciated more fully from the following detailed description of embodiments of the invention, taken in conjunction with the accompanying drawings of which.

Figure 1:
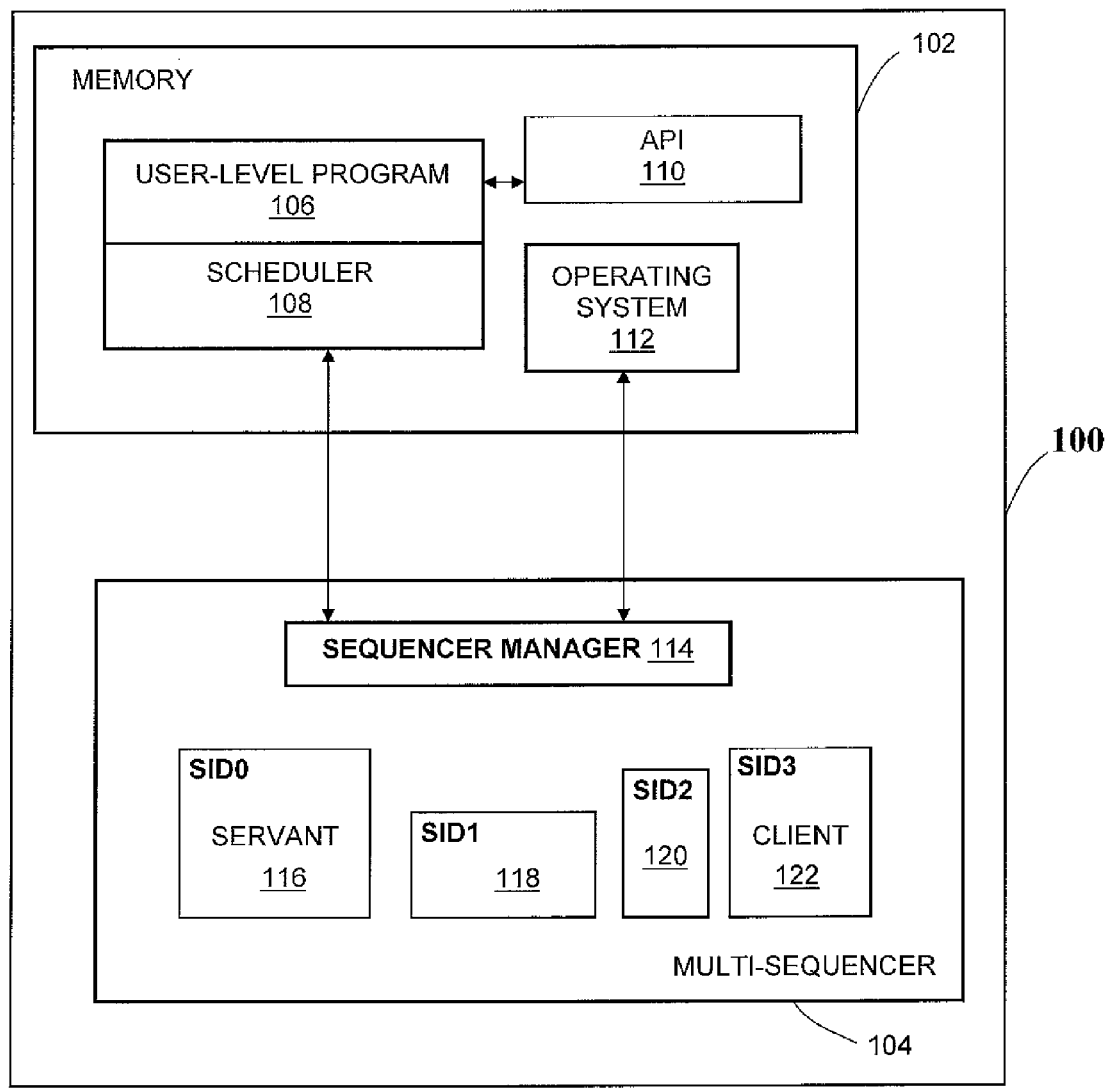
FIG. 1 is a block diagram illustration of a multi-sequencer system according to one illustrative embodiment of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention However it will be under stood by those of ordinary skill in the art that the embodiments of the invention may be practiced without these specific details. In other instances, well-known methods and procedures have not been described in detail so as not to obscure the embodiments of the invention.

Some portions of the detailed description in the following are presented in terms of algorithms and symbolic representations of operations on data bits or binary digital signals within a computer memory. These algorithmic descriptions and representations may be the techniques used by those skilled in the data processing arts to convey the substance of the work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Some embodiments of the invention may be implemented, for example, using a machine-readable medium or article which may store an instruction or a set of instructions that, if executed by a machine, cause the machine to perform a method and/or operations in accordance with embodiments of the invention Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like The instructions may include any suitable type of code, for, example, source code, target code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Embodiments of the invention may include apparatuses for performing the operations herein. These apparatuses may be specially constructed for the desired purposes, or they may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROM), random access memories (RAM), electrically programmable read-only memories (EPROM), electrically erasable and programmable read only memories (EEPROM), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the invention are not described with reference to any particular programming language. It will be appreciated that a variety of programming languages may be used to implement the teachings of the invention as described herein.

In the following description, various figures, diagrams, flowcharts, models, and descriptions are presented as different means to effectively convey and illustrate different embodiments of the invention that are proposed in this application. It shall be understood by those skilled in the art that they are provided merely as illustrative samples, and shall not be constructed as limiting.

FIG. 1 is a block diagram illustration of a multi-sequencer system 100 according to one illustrative embodiment of the invention.

Multi-sequencer system 100, as shown in FIG. 1, may include a memory 102 and a multi-sequencer hardware 104. Memory 102 may include, for example, a user-level program 106, a scheduler 108, an Application Program Interface (API) 110, and an Operating System (OS) 112. Multi-sequencer hardware 104 may include, for example, a sequencer manager 114, and a plurality of sequencers, for, example, sequencers 116, 118, 120 and 122, denoted as sequencers SID0, SID1, SID2, and SID3, respectively in FIG. 1. Although four sequencers are shown in FIG. 1, a person skilled in the art may appreciate that multi-sequencer hardware 104 may have other numbers of sequencers.

Sequencer manager 114 may be implemented as a driver, an extension of an operating system such as an extension of OS 112, any other hardware or a combination of hardware and software. Multi-sequencer hardware 104 may be symmetric or asymmetric in terms of the types of sequencers 116, 118, 120 and/or 122 one or more of the sequencers 116, 118, 120 and/or 122 may be a physical processor with its own set of execution resources. Alternatively, one or more of the sequencers 116, 118, 120 and/or 122 may be a logical processor (of, for example, a hyper-threaded processor), that may share physical resources with other logical processors. Sequencers 116, 118, 120 and 122 may be implemented in a single hardware core or in multiple separate hardware cores.

A non-exhaustive list of examples for multi-sequencer system 100 may include a desktop personal computer, a work station, a server computer, a laptop computer, a notebook computer, a hand-held computer, a personal digital assistant (PDA), a mobile telephone, a game console, and the like.

A non-exhaustive list of examples for memory 102 may include one or any combination of the following semiconductor devices, such as synchronous dynamic random access memory (SDRAM) devices, RAMBUS dynamic random access memory (RDRAM) devices, double data rate (DDR) memory devices, static random access memory (SRAM) devices, flash memory (FM) devices, electrically erasable programmable read only memory (EEPROM) devices, non-volatile random access memory (NVRAM) devices, universal serial bus (USB) removable memory devices, and the like; optical devices, such as compact disk read only memory (CD ROM), and the like; and magnetic devices, such as a hard disk, a floppy disk, a magnetic tape, and the like. Memory 102 may be fixed within or removable from system 100.

According to one illustrative embodiment of the invention, user-level program 106 may access a thread library via Application Program Interface (API) 110 API 110 may provide creation, control, and synchronization of threads to user-level program 106. Scheduler 108 may schedule instructions of the threads for execution on multi-sequencer hardware 104.

A non-exhaustive list of examples for multi-sequencer hardware 104 may include a plurality of single-threaded or multi-threaded central processing unit (CPU), digital signal processor (DSP), reduced instruction set computer (RISC), complex instruction set computer (CISC) and the like. Moreover, multi-sequencer 104 may be part of an application specific integrated circuit (ASIC) or may be a part of an application specific standard product (ASSP).

According to one illustrative embodiment of the invention, multi-sequencer hardware 104 may be a single-core processor having implemented sequencers 116, 118, 120 and 122 (SID0-SID3) that may be, for example, logical processors. Single-core processor 104 may be able to support, for example, concurrent, simultaneous, and/or switch-on-event multithreading. According to one illustrative embodiment, each of the sequencers SID0-SID3 may have its own next-instruction-pointer logic, while the same single-core processor 104 may execute all the thread instructions. Each logical processor SID1-SID3 may maintain its own version of the architecture state, although execution resources of single-core processor 104 may be shared among concurrent, simultaneous, and/or switch-on-event threads.

While the illustrative embodiment of multi-sequencer hardware 104 discussed above may refer to single thread per sequencer, a person skilled in the art shall appreciate that the application herein is not limited to single-threaded processors. The techniques discussed herein may equally be employed in any Chip Multiprocessing (CMP) or Simultaneous Multithreading Processor (SMP) system, including in a hybrid system with CMP processors and SMP processors where each core of a CMP processor is a SMP processor or a Switch-On-Event Multiprocessor (SoeMP). For example, the techniques disclosed herein may be used in a system that includes multi-threaded processing cores in a single chip hardware package 104.

As is discussed above, sequencers SID0-SID3 are not necessarily uniform and may be asymmetric with respect to factors that may affect computation quality such as, for example, processing speed, processing capability, and power consumption For example, sequencer SID0 may be a "heavyweight" sequencer in that it may be designed to process most of the instructions in a given instruction set architecture (e.g. IA-32 Instruction Set Architecture associated with a 32-bit processor). Whereas, sequencer SID1 may be a "lightweight" sequencer in that it may process a selected subset of those instructions. In another embodiment of the invention, a heavyweight processor may be one that processes instructions at a faster late than a lightweight processor. In addition, some sequencers may be visible and other sequencers may be invisible to an operating system. For example, sequencer SID0 may be visible to OS 112, whereas sequencers SID1 to SID3 may be sequestered from OS 112 However, this does not mean that heavyweight sequencers are OS-visible and/or lightweight sequencers are OS-sequestered. An operating system does not schedule instructions on a sequencer that is in a sequestered state (such a sequencer is referred to herein as an OS-sequestered sequencer).

According to some illustrative embodiments of the invention, multi-sequencer system 100 may be able to provide services of persistent user-level threads (PULTs), as detailed below with reference to FIGS. 2-8. In this application, a regular user-level thread, or simply referred to hereinafter as user-level thread, may be a sequence of instructions that contains only non-privileged instructions that tun in a user-level or ring-3 level. Typically a user-level thread may be supported "behind the scenes" by an OS thread, which may also be denoted as native OS thread or just native thread. In this OS thread context, at least one user-level thread may run either on an OS-visible sequencer or an OS-sequestered sequencer. When the OS thread is context switched out (and in) by the OS, the contexts of all the sequencers belonging to the OS thread will be saved (and restored). Accordingly, the user-level threads running on these sequencers will be suspended (and resumed). According to one embodiment of the invention, a persistent user-level thread (PULT) is a user-level thread that runs on an OS-sequestered sequencer. The PULT may be executed in an environment, for example, a virtual address space (VAS) of another user-level thread that creates the PULT. The execution of the PULT may be independent of, and therefore not in synchronous with, the execution of the user-level thread that creates the PULT Even when the OS thread to which the user-level thread belongs is context switched out, the PULT may continue execution on the OS-sequestered sequencer. This is referred to herein by the notion of "persistence"—continued execution of the user-level thread irrespective of the OS thread context switch activities on the thread that spawned or created the PULT.

Figure 2:
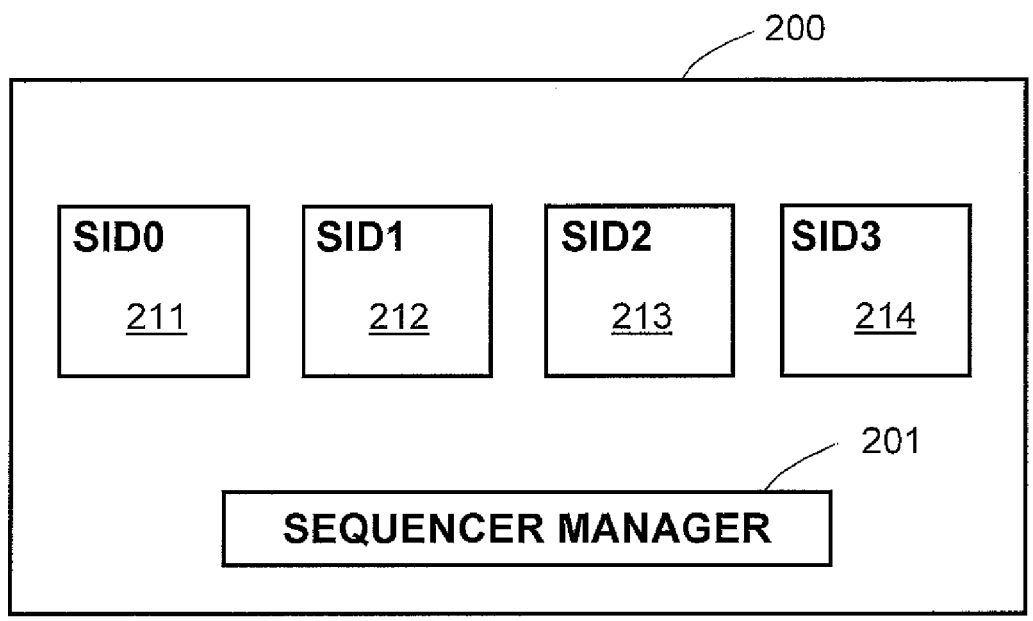
FIG. 2 is a simplified logical view of hardware that forms a part of a multi-sequencer system according to one illustrative embodiment of the invention.

FIG. 2 is a simplified logical view of hardware 200 that forms a part of a multi-sequencer system according to one illustrative embodiment of the invention.

Hardware 200 may correspond to multi-sequencer hardware 104 that forms a part of multi-sequencer system 100 in FIG. 1. Multi-sequencer hardware 104 may include sequencer manager 114 and, for example, a plurality of sequencers 116, 118, 120 and 122 as shown in FIG. 1. According to one embodiment of the invention, sequencer manager 114 may be able to virtualize sequencers 116, 118, 120 and 122 in such away that sequencers 116, 118, 120 and 122 appear-to user-level program 106 as uniform and symmetric. In other words, sequencer manager 201, which corresponds to sequencer manager 114 in FIG. 1, may mask the asymmetry of sequencers 211, 212, 213 and 214 so that from a logical point of view of an assembly language programmer sequencers 211, 212, 213 and 214 may look uniform and symmetric, as in FIG. 2, and symbolized by their squares of equal size Sequencers 211, 212, 213 and 214 may represent logical processors SID0, SID1, SID2 and SID3 in FIG. 1.

Figure 3:
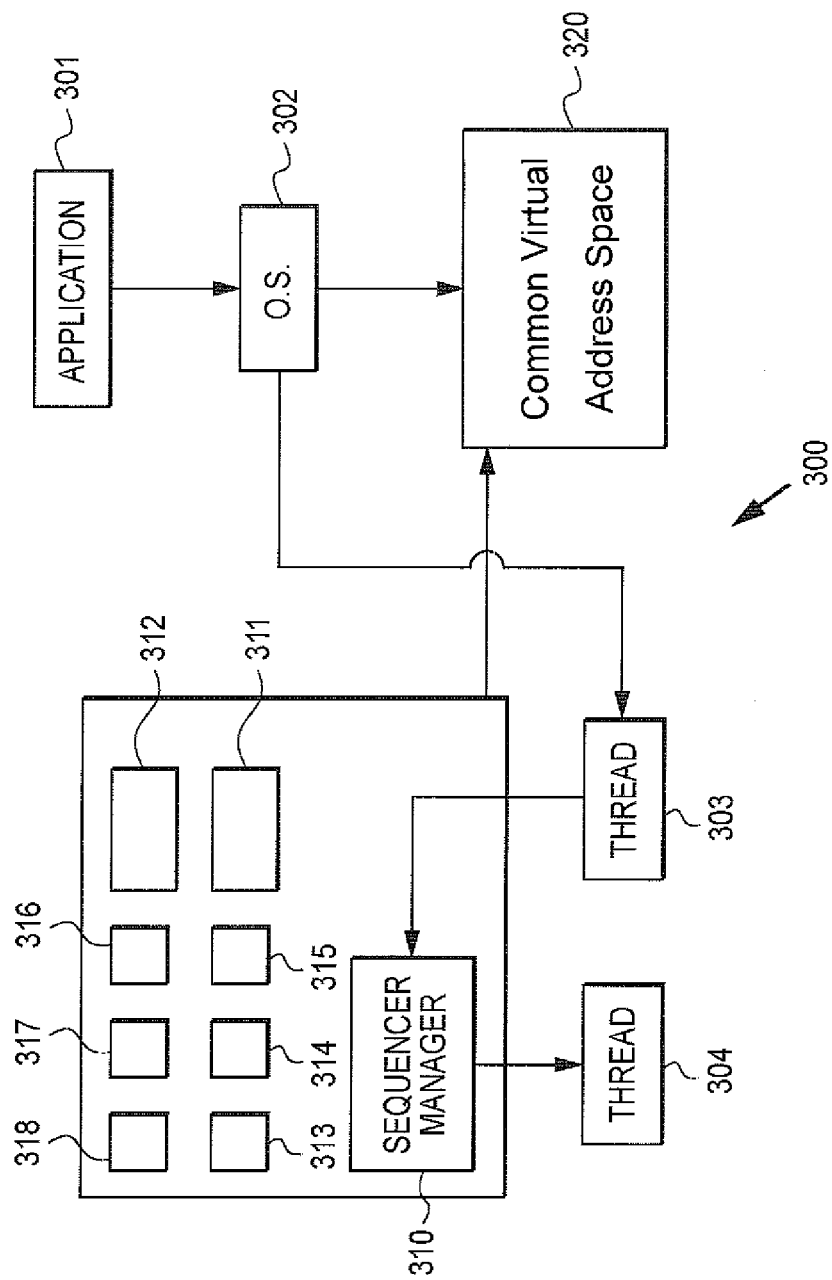
FIG. 3 is a simplified illustration of a multi-sequencer system able to provide persistent user-level thread services according to one illustrative embodiment of the invention.

FIG. 3 is a simplified illustration of a multi-sequencer system 300 able to provide persistent user-level thread services according to one illustrative embodiment of the invention.

According to one embodiment of the invention, execution of an application 301, which may be, for example, user-level program 106 of FIG. 1 may be managed by an operating system (OS) 302. OS 302 may handle execution of application 301 by creating and scheduling one or more native threads, each potentially including user-level threads, such as for example a native thread 303 in FIG. 3 which run on one of a set of sequencers that are visible to OS 302, for example, sequencers 311 and 312. OS 302 may manage sequencers 311 and 312 through one or more of its OS kernels. OS 302 may also control the privilege states of sequencers 311 and 312 and be responsible for handling interrupts and exceptions that may occur on sequencers 311 and 312.

According to one embodiment of the invention, a sequencer manager 310 may have control access to both sequencers 311 and 312 that are OS-visible, and another set of sequencers, for example, sequencers 313, 314, 315, 316, 317 and 318 that are sequestered from OS 302 and not managed by the kernels of OS 302. Sequencers 313, 314, 315, 316, 317 and 318 are OS-sequestered, or "OS-invisible", sequencers.

According to one embodiment of the invention, an OS-scheduled thread, (e.g., a native thread that potentially includes a user-level thread) may interact with sequencer manager 310 through an interface that may be provided through hardware or software or a combination of both. In order to use sequencers that are not visible to OS 302, such as sequencers 313, 314, 315, 316, 317 and 318, an OS-scheduled thread, for example the native thread 303, may send a request to sequencer manager 310 to create a user-level thread, for example, thread 304, to turn on one of the OS-sequestered sequencers, for example, sequencer 313. According to one embodiment of the invention, user-level thread 304 may run on sequencer 313 independent of the OS context switch activities of the native thread 303 and therefore may be a persistent user-level thread (PULT).

In the following description, native thread 303 is used as an example to illustrate the creation and execution of a persistent user-level thread. A person skilled in the art will appreciate that following description also applies to other threads such as, for example a user level thread that belongs to a native thread.

According to one illustrative embodiment of the invention, OS-sequestered sequencer 313 may execute PULT 304 in a virtual address space (VAS) 320 that is shared by user-level thread 303 running on OS-visible sequencer 311. OS 302 may create VAS 320 for the execution of application 301. According to one illustrative embodiment of the invention, by sharing a common VAS 320, sequencer manager 310 may be able to capture an execution environment, for example, a virtual address map, of user-level thread 303 that runs on OS-visible sequencer 311, and then apply this execution environment to PULT 304 that runs on OS-sequestered sequencer 313. According to one embodiment of the invention, OS-sequestered sequencer 313 may have one or more snoopy TLB's (Translation Lookaside Buffer) that are able to automatically track future changes in the virtual address space. A TLB may be a small cache present in a processor that keeps track of virtual to physical address translation for quick lookup. A processor may use this TLB to avoid unnecessary page walks to translate virtual address to physical address.

Figure 4:
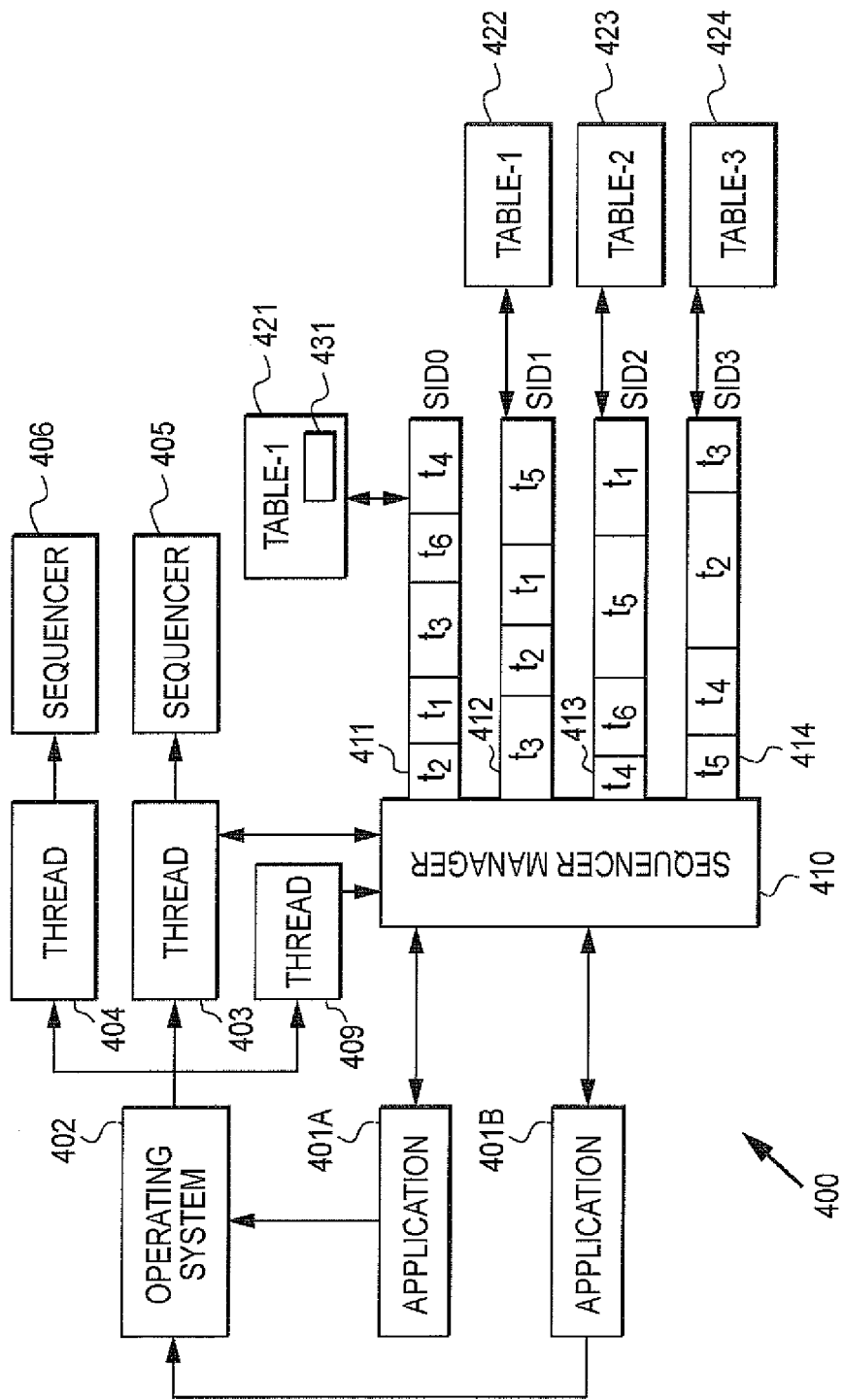
FIG. 4 is a conceptual illustration of a multi-sequencer system able to provide persistent user-level thread services according to one illustrative embodiment of the invention.

FIG. 4 is a conceptual illustration of a multi-sequencer system 400 able to provide persistent user-level thread services according to one illustrative embodiment of the invention.

According to one embodiment of the invention, multi-sequencer system 400 may include a sequencer manager 410 that manages a plurality of OS-sequestered sequencers, for example, sequencers 411, 412, 413 and 414, and other OS-visible sequencers, for example, sequencers 405 and 406. An operating system (OS) 402 may manage execution of one or mote user-level applications, for example, applications 401A and 401B. OS 402 manages applications 401A and 401B by creating one or more threads including, for example, user-level threads 403 and 404, which run on OS-visible sequencers 405 and 406, and other native threads.

Sequencer manager 410 may provide execution resources to applications 401A and 401B through access to sequencers 411, 412, 413 and 414, which are sequestered from OS 402 and not managed by OS 402. The access may be provided through requests made by threads 403 and 404 running on OS-visible sequencers 405 and 406 or other native threads scheduled by the OS. As a result, applications 401A and 401B may have access to OS-sequestered sequencers 411, 412, 413 and 414 via user-level threads 403 and/or 404 or other native threads.

According to one embodiment of the invention, sequencer manager 410 may allocate various time slots on sequencers 411, 412, 413 and 414 for execution of one or more persistent user-level threads created by user-level threads 403 and 404 for applications 401A and 401B. For example, symbols $t_1$, $t_2$, $t_3$, $t_4$, $t_5$ and $t_6$ in FIG. 4 may denote the time slots that are assigned for the execution of PULTs $T_1$, $T_2$, $T_3$, $T_4$, $T_5$ and $T_6$, respectively.

According to one embodiment of the invention, sequencer manager 410 may set up one or more interrupt descriptor tables, for example, tables 421, 422, 423 and 424, for one or more OS-sequestered sequencers, for example, sequencers 411, 412, 413 and 414. An interrupt descriptor table, for example, table 421, may include an event handler 431 to handle events occurring on sequencer 411. During execution time, for example, $t_3$ of PULT 13 on an OS-sequestered sequencer, for example, sequencer 411, PULT $T_3$ may encounter an event or situation such as, for example, a page fault or a system call, that requires handling or attention of OS 402. Event handler 431 may then suspend the execution of PULT $T_3$ and save the execution state, at the time the event happens, of PULT $T_3$.

According to another embodiment of the invention, an OS-invisible sequencer, for example, sequencer 411 may directly interrupt the execution of an OS-visible sequencer, for example, sequencer 405 that invoked the PULT $T_3$, when encountering a page fault or a system call. Sequencer 411 may then send a trigger to sequencer manager 410 requesting handling of the interruption. According to yet another embodiment of the invention, OS-sequestered sequencer 411 may program a ring-0 service channel or channel to handle a page fault or system call. A channel may be a register holding architectural state that includes, for example, a trigger-response mapping where the trigger is an architecturally defined set of one or more processor conditions and the response is a service routine. In addition, a channel may be programmed, for example, by a user-level instruction. When the page fault or system call occurs, OS-sequestered sequencer-411 may invoke a handler whose address is specified in the channel.

PULT $T_3$ may remain suspended until a time when a new user-level thread, for example, thread 409, which runs the same application 401A, is scheduled to run on an OS-visible sequencer. Thread 409, also referred to as a service thread, may make a request to sequencer manager 410 to confirm or verify whether there are any PULTs that have been suspended and are waiting for OS services which may be provided, for example, through a proxy execution as described below in detail. A proxy execution may be performed through thread 409 impersonating or imitating PULT $T_3$, by picking up the state of PULT $T_3$ from sequencer manager 410. The execution state of PULT $T_3$ may be resumed by service thread 409 which shares a common address space, for example, a commonly shared virtual address space (VAS) (FIG. 3) Thread 409 may then service the execution condition that has caused the suspension of PULT $T_3$. After the service, thread 409 may proceed to save the post-execution state and return the state to sequencer manager 410. Sequencer manager 410 may subsequently pass the state to PULT $T_3$ to resume its execution.

The proxy execution discussed above may create an illusion of symmetry to an application programmer and therefore hide the inherent asymmetric nature of how a multi-sequencer system, for example, system 100, is built.

Figure 5:
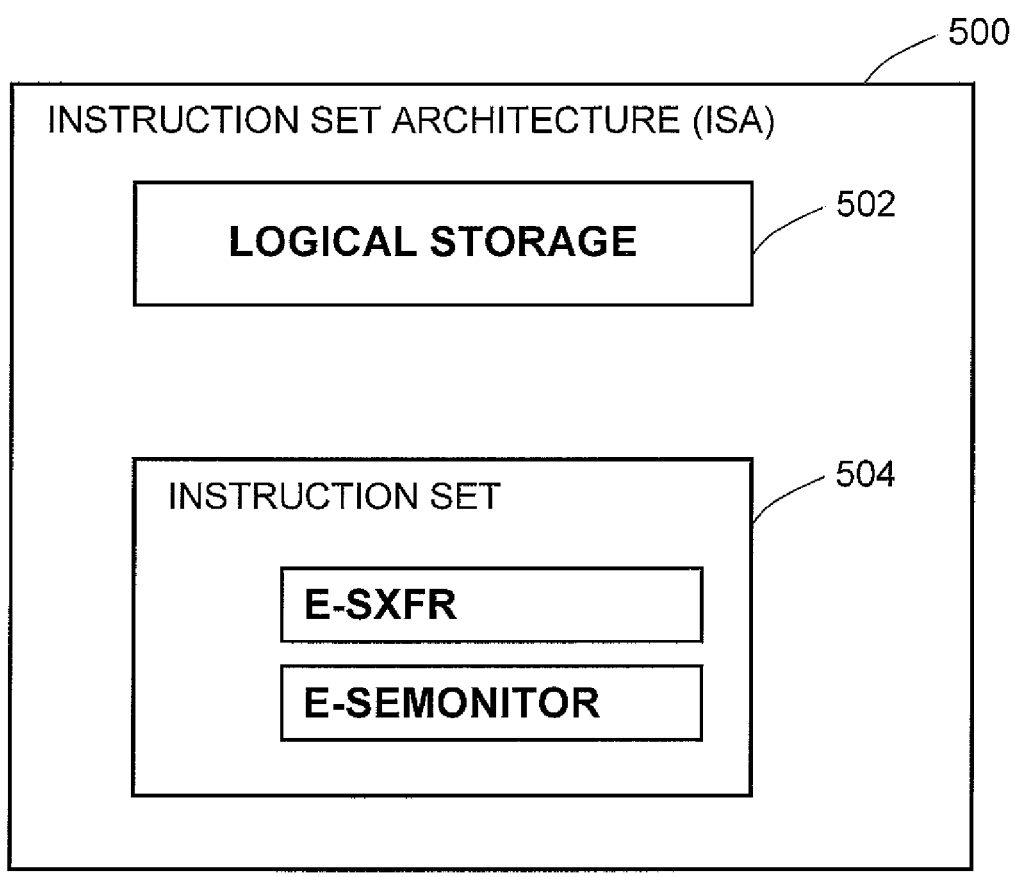
FIG. 5 is an illustrative view of an instruction set architecture of a multi-sequencer system according to one illustrative embodiment of the invention.

FIG. 5 is an illustrative view of an Instruction Set Architecture (ISA) 500 of a multi-sequencer system according to one illustrative embodiment of the invention.

An ISA defines a logical view of a system as seen by an assembly language programmer, binary translator, assembler or the like. ISA 500 may include a logical storage 502 and an instruction set 504. Logical storage 502 may define a visible memory hierarchy, addressing scheme, register set, etc for a multi-sequencer system such as, for example, multi-sequencer system 100 as in FIG. 1, whereas instruction set 504 may define the instructions and the format of the instructions that multi-sequencer system 100 may support.

Instruction set 504 may include the instruction set known as IA-32 instruction set and, according to illustrative embodiments of the invention, its extension although the present invention is not limited in this respect and other instruction sets are possible. According to one embodiment of the invention, instruction set 504 may include, for example, an E-SXFR instruction that includes a SXFR control-transfer instruction and its extension, and an E-SEMONITOR instruction that includes a SEMONITOR monitoring instruction and its extension. Compared to SXFR and SEMONITOR, which can be performed between two sequencers belonging to the same OS native thread, E-SXFR and E-SEMONITOR can be performed between two sequencers that belong to two distinct OS native threads respectively, which may run at different privilege levels. For example, one thread may be a user-level application that is subject to OS context switch, and the other thread may be a PULT that runs persistently in the privilege level, like a device driver, and is not subject to OS context switch.

According to one embodiments of the invention, the E-SXFR instruction may be used to send a signal from a first sequencer to a second sequencer, and the E-SEMONITOR instruction may be used to configure the second sequencer to monitor for signals coming from the first sequencer. Furthermore, the E-SXFR control transfer and E-MONITOR monitoring instructions are sequencer aware, and may be used to construct other sequencer aware composite instructions.

Figure 6:
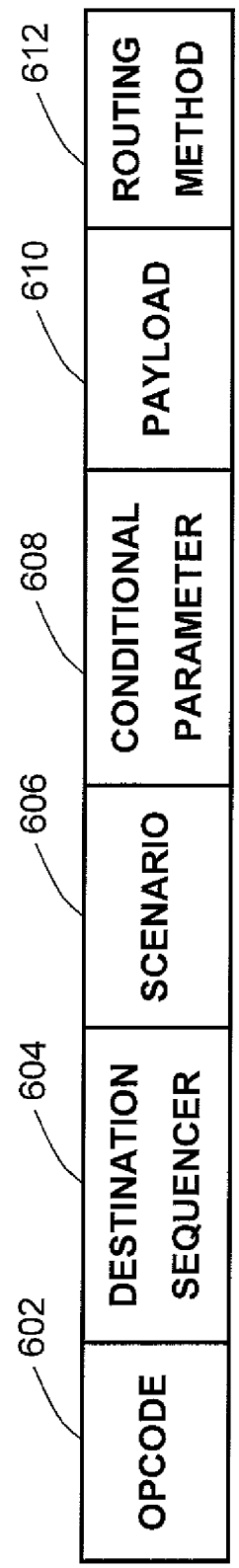
FIG. 6 is a simplified illustration of sample instruction format of a control-transfer instruction according to one illustrative embodiment of the invention.

According to one embodiment of the invention, an E-SXFR instruction may have a sample instruction format as shown in FIG. 6, It is shown, in FIG. 6, that the E-SXFR instruction may include an Opcode 602, and operands 604, 606, 608, 610 and 612. According to one embodiment of the invention, a sequencer manager may provide an E-SXFR instruction with operands, which may include the privilege state of a sequencer, such as to create an execution environment to service suspended persistent user-level threads.

According to one embodiment, operand 604 may correspond to a sequencer ID (SID) for a destination/target sequencer to which the E-SXFR instruction signal is sent. Operand 606 may include a scenario or control message, which may be an architecturally defined identifier code representing a condition or anticipated event. A scenario may be used to affect asynchronous control transfer as described in detail with reference to TABLE 1.

According to one embodiment, operand 608 may include a parameter that conditions the execution of instructions on a sequencer that executes the E-SXFR instruction. Examples of parameters, as shown in FIG. 6 as conditional parameter, may include a "WAIT" or "NO-WAIT" parameter. For example, when an E-SXFR instruction is used in a proxy execution scenario, the WAIT conditional parameter may cause the execution of instructions on a sequencer that executes the E-SXFR instruction to stop, pending completion of proxy execution on another sequencer. The NO-WAIT conditional parameter may specify that execution on a sequencer that executes the E-SXFR instruction may continue in parallel with proxy execution on another instruction sequencer.

According to one embodiment, operand 610 may include a scenario-specific payload or data message. For example, in the case of a FORK scenario, the payload may include an instruction pointer at which execution on the sequencer identified by operand 604 is to commence. According to another embodiment, payload operand 610 may include an instruction pointer, a stack pointer, a set of control registers, etc. Addresses contained in payload operand 610 may be expressed in a variety of addressing modes such as, for example, literal, register indirect, and/or base/offset addressing.

According to one embodiment, operand 612 may specify a Touting method or function on the SID contained in operand 604. The touting function controls whether the signal, which is created as a result of executing the E-SXFR instruction, is sent as a broadcast, a unicast, or a multicast signal. The touting function may also encode information such as, for example, topology-specific hint that may be used to assist an underlying inter-sequencer interconnect in routing to deliver the signal.

Figure 7:
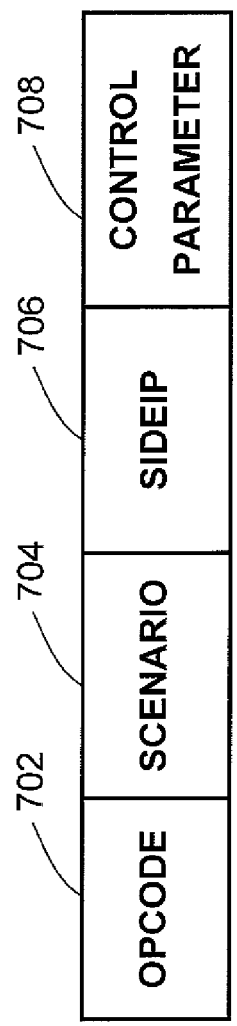
FIG. 7 is a simplified illustration of sample instruction format of a monitoring instruction according to one illustrative embodiment of the invention.

According to one embodiment, the E-SEMONITOR instruction may have a sample instruction format as shown in FIG. 7. It is shown, in FIG. 7, that the E-SEMONITOR instruction may include an Opcode 702, and operands 704, 706 and 708. Operands 704, 706 and 708 may include information of the privilege state of sequencer to help create an execution environment for a persistent user-level thread. For example, operand 704 may specify a scenario by including a scenario ID. Operand 706 may include information related to a sequencer ID (SID) and an instruction pointer (EIP). For descriptive convenience, information contained in operand 706 may be referred to herein as a "SIDEIP", as shown in FIG. 7.

The E-SEMONIIOR instruction may map a scenario specified in operand 704 to a SIDEIP specified in operand 706. Mapping of a scenario to a SIDEIP may be referred to herein as mapping of a "service channel". Operand 708 may allow a programmer to enter one or more control parameters to specify or control how a particular service channel is to be serviced. For example, a programmer may use the E-SEMONITOR instruction to program the service channels that a sequencer may monitor.

Based on the above description, it will be appreciated that both the E-SXFR and E-SEMONITOR instructions are "sequencer-aware" instructions in that they include operands that may identify particular sequencers.

Figure 8:
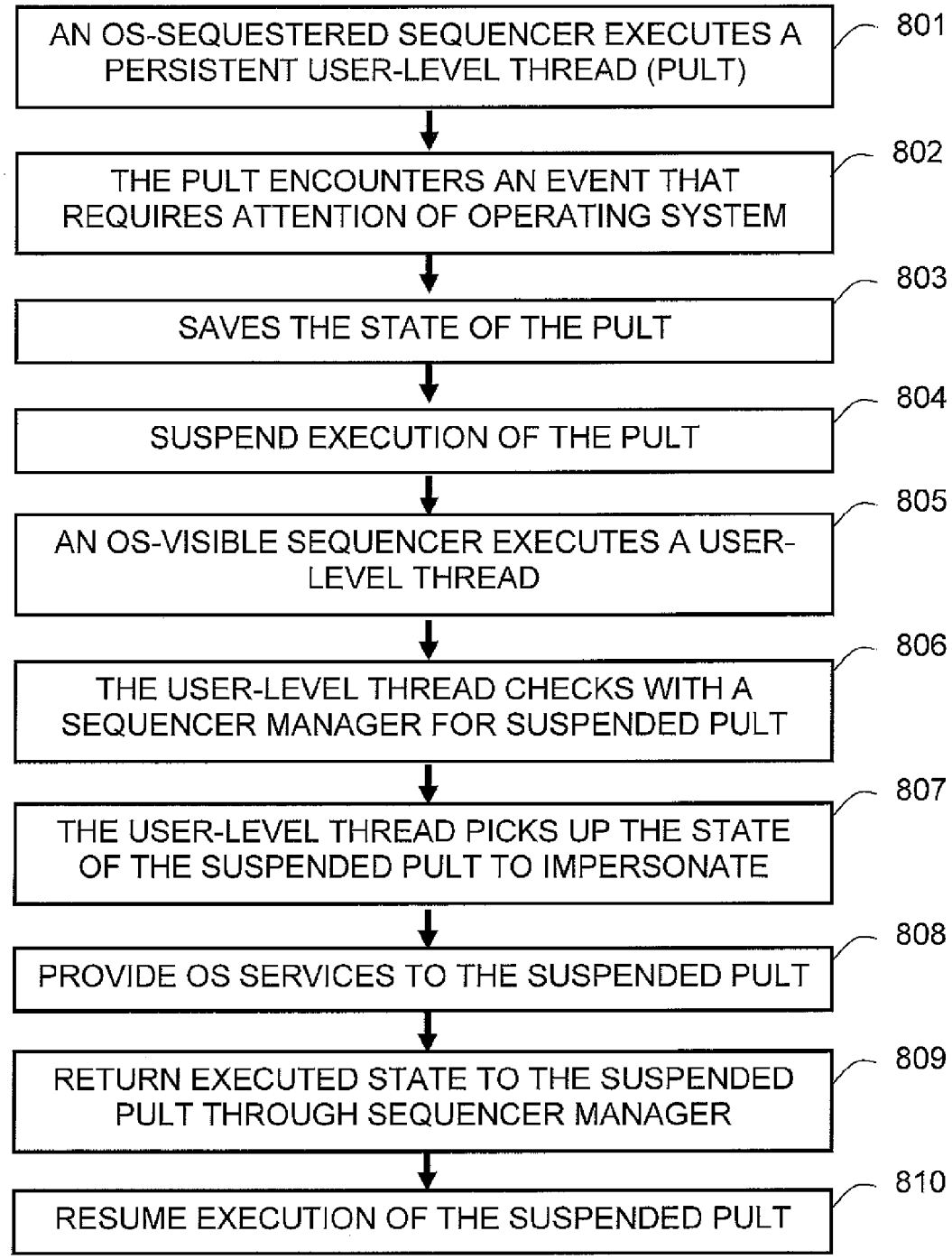
FIGS. 8 and 9 are simplified flowchart illustrations of the execution of a persistent user-level thread according to one illustrative embodiment of the invention.
Figure 9:
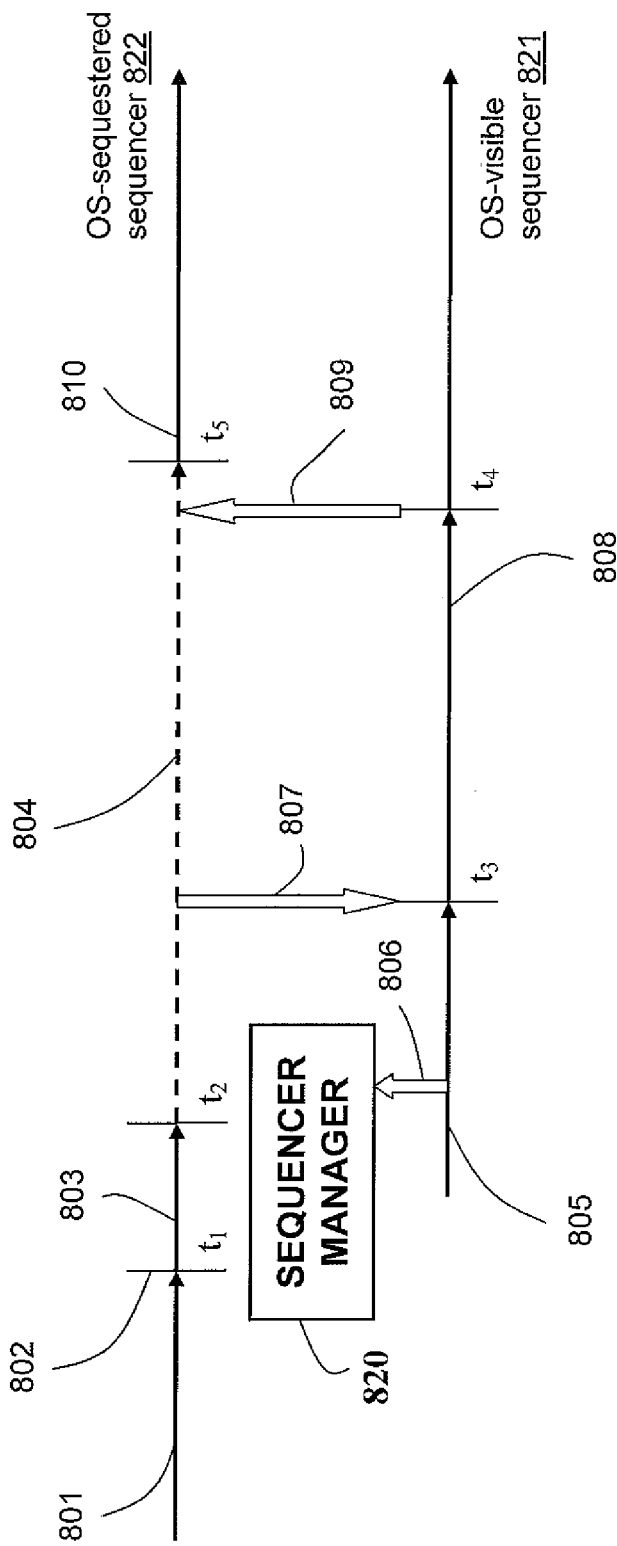

FIGS. 8 and 9 are simplified flowchart illustrations of the execution of a persistent user-level thread according to some illustrative embodiments of the invention. The same block numbers are used to indicate the same operation.

According to one embodiment of the invention, an OS-sequestered sequencer 822 may execute a persistent user-level thread as indicated at block 801. The persistent user-level thread may be referred to herein as PULT-1 for convenience of description. PULT-1 may be created, for example, by a first user-level thread that is executed by a first OS-visible sequencer. During execution, PULT-1 may encounter one or more events that require services or attention of an OS. A second user-level thread, which may or may not be the same user-level thread as the first user-level thread that created PULT-1 and execute on a second OS-visible sequencer for example OS-visible sequencer 821, may provide the requested OS services to PULT-1 as described below in detail.

According to one embodiment of the invention, PULT-1 may encounter an event at time $t_1$ requiring OS services, as indicated at block 802 in FIGS. 8 and 9. Upon detection of the event, a sequencer manager 820 may invoke a procedure to save the state of PULT-1 at time $t_1$, as indicated at block 803, such as a logic pointer, for example. The execution of PULT-1 may then be suspended from time $t_2$ and onward as indicated at block 804, after the state of PULT-1 has been saved as indicated at block 803. According to one embodiment of the invention, the execution of PULT-1 may also be suspended by sequencer manager 820, through an external interruption, after receiving a notification about an event that requires operating system services. PULT-1 may remain suspended until the requested OS services ate provided through, for example, proxy execution by a service thread.

According to one illustrative embodiment of the invention, at some point of time, an OS-scheduled thread such as a new user-level thread may start to run on OS-visible sequencer 821 as indicated at block 805. This new user-level thread may be executed for the same application as PULT-1 This thread may be able to provide OS services through, for example, proxy execution, to PULT-I and therefore may be referred to herein as a service thread. Before providing OS services, the service thread may check or verify with sequencer manager 820, as indicated at block 806, whether there are any suspended PULTs that are waiting for OS services.

The service thread may identify PULT-1 as a thread waiting for OS services. According to one embodiment of the invention, the service thread may then proceed to imitate, in other words, impersonate, PULT-1 by picking up the execution state of PULT-1 through, for example, their commonly shared virtual address space (VAS) as indicated at block 807. PULT-1, imitated by the service thread, may then get executed on the OS-visible sequencer executing the service thread to receive OS services. As a result, OS services are provided to PULT-1, as indicated at block 808, through proxy execution of the service thread and the condition under which PULT-1 was suspended is now serviced by the operating system. According to one embodiment of the invention, a user level thread that runs on an OS-visible sequencer, for example, OS-visible sequencer 821, may detect a suspended PULT by monitoring an address location using an scenario. A service scenario is a condition that may be used to monitor, for example, cache misses, and if a cache miss occurs which causes, for example, a threshold being crossed, a handler in the service channel may be invoked.

According to one embodiment of the invention, after the operating system completes servicing the condition of the suspended PULT-1, the post-execution state of PULT-1 may be saved and subsequently returned to OS-sequestered sequencer 822 through sequencer manager 820 as indicated at block 809. After receiving the post execution state from the service thread, OS-sequestered sequencer. 822 may resume its execution of PULT-1 as indicated at block 810.

Table 1 contains a list of sample scenarios according to some illustrative embodiments of the invention.

TABLE 1

| SPU Characteristics | | Egress Service Scenarios | Ingress Service Scenarios |
|---|---|---|---|
| OS Visibility | OS-invisibility | Operations that require OS handling and cause cross ring-level transitions, e.g., Page fault handling I/O access | Incoming control messages Go_shred Report/Self Save/Restore_shred Single-step_shred |
| | OS-visible | Outgoing control messages Fork Join Yield Wait Scatter/Set Gather/Get CSAVE/RSTOR Go/Halt/Single-step SSE13 Instruction | Operations that require OS handling and cause cross ring-level transitions, e.g., Page fault I/O access |
| Core Complexity | Simple Complexity | | SSE13 execution |

According to illustrative embodiments of the invention, scenarios in Table 1 may be divided into egress services and ingress services. Among each service, operations and control messages may be characterized by their OS-visibility which may be part of the characteristics of a shred processing unit (SPU). Among egress services, there are scenarios of operations that fall into the category of resource not available (RNA), which is a category for events generated during execution on a sequencer due to access to a resource not being available on an OS-sequestered sequencer. According to one embodiment of the invention, scenarios that fall into the category of RNA may include, for example, page fault handling and/or I/O access on the OS-sequestered sequencer which is incapable of directly activating OS service.

According to illustrative embodiments of the invention, accompanying these scenarios of operations described above is a set of outgoing control messages. In one illustrative embodiment, the messages may include, for example, the messages as listed under egress service scenarios in Table 1. However, the invention is not limited in this respect and other messages may be used. The control messages go to one or more OS-visible sequencers.

In relation to the egress service scenarios discussed above, there are ingress service scenarios that fall into the category of an OS-visible sequencer providing resource to service requests from an OS-sequestered sequencer. As is shown in Table 1 under ingress service scenarios, these services correspond directly to the scenarios under egress service but are available from OS-visible sequencers in one illustrative embodiment, the incoming control messages, accompanying the ingress services, may include the messages as listed under ingress service scenarios in Table 1 however, the invention is not limited in this respect and other messages may be used the incoming messages may come from one or more OS-sequestered sequencers.

According to illustrative embodiments of the invention, instructions that serve the egress services are, for example, relatively simple SSE13 instructions in terms of core complexity, and instructions that serve, for example, the ingress services or requests from an OS-sequestered sequencer are, in general, more complex.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A processor comprising:
a first hardware core comprising at least one operating-system-visible sequencer to execute instructions scheduled by an operating system; and
a second hardware core comprising at least one operating-system-sequestered sequencer for which the operating system does not schedule instructions, wherein the at least one operating-system-visible sequencer is to create a persistent user-level thread to run on the at least one operating-system-sequestered sequencer, wherein the persistent user-level thread is to continue execution, irrespective of context switch activities of an operating-system-scheduled thread executed on the at least one operating-system-visible sequencer.

2. The processor of claim 1, wherein the processor is to suspend execution of the persistent user-level thread when the persistent user-level thread encounters an event to be handled by the operating system, and to communicate to a second operating-system-visible sequencer a control-transfer instruction for execution at a privileged level.

3. The processor of claim 2, further comprising a sequencer manager to cause a service thread executed on the at least one operating-system-visible sequencer to imitate the suspended persistent user-level thread to provide operating system services to the suspended persistent user-level thread.

4. The processor of claim 3, wherein the sequencer manager is to:
cause the service thread to pick up a state of the persistent user-level thread via the imitation;
provide a proxy execution to the persistent user-level thread; and return a post execution state to the persistent user-level thread to enable the persistent user-level thread to resume running from the post execution state.

5. The processor of claim 1, further comprising a plurality of hardware cores.

6. The processor of claim 5, wherein at least one of the plurality of hardware cores is asymmetric to another of the plurality of hardware cores.

7. The processor of claim 5, wherein a first portion of the plurality of hardware cores are visible to the operating system and a second portion of the plurality of cores are invisible to the operating system.

8. The processor of claim 1, wherein the processor comprises a digital signal processor (DSP).

9. The processor of claim 1, wherein the second hardware core is adapted to process a subset of instructions of an instruction set architecture (ISA).

10. A non-transitory machine-readable medium having stored thereon instructions, which if performed by a machine cause the machine to perform a method comprising:
creating a persistent user-level thread to run on an operating-system-sequestered sequencer independently of context switch activities on an operating-system-scheduled thread running on an operating-system-visible sequencer, wherein the persistent user-level thread continues execution when the operating-system-scheduled thread is context switched;
suspending running of the persistent user-level thread when the persistent user-level thread encounters an event to be handled by an operating system; and
communicating to another operating-system-visible sequencer a control-transfer instruction, and executing the control-transfer instruction at a privileged level.

11. The non-transitory machine-readable medium of claim 10, wherein the operating-system-scheduled thread and the persistent user-level thread share a common virtual address space.

12. The non-transitory machine-readable medium of claim 10, wherein the method further comprises causing a service thread running on another operating-system-visible sequencer to imitate the suspended persistent user-level thread to provide operating system services to the suspended persistent user-level thread, the imitating enabling the service thread to access an execution state of the suspended persistent user-level thread.

13. The non-transitory machine-readable medium of claim 12, wherein the method further comprises:
causing the service thread to access the execution state of the persistent user-level thread through a common shared virtual address space;
providing a proxy execution to the persistent user-level thread; and
returning a post execution state to the persistent user-level thread.

14. The non-transitory machine-readable medium of claim 13, wherein the method further comprises resuming running of the persistent user-level thread from the post execution state.

15. The non-transitory machine-readable medium of claim 13, wherein the service thread and the persistent user-level thread run in the context of a same application.

16. The non-transitory machine-readable medium of claim 10, wherein the method further comprises processing instructions at a first rate in the operating-system-visible sequencer and at a second rate in the operating-system-sequestered sequencer.

17. A system comprising:
a multi-core processor including a plurality of cores and a controller to create a persistent user-level thread to run on an operating-system-sequestered core independently of context switch activities on an operating-system-scheduled thread to run on an operating-system-visible core, wherein the persistent user-level thread is to continue execution when the operating-system-scheduled thread is context switched, communicate a control-transfer instruction to another operating-system-visible core, and execute the control-transfer instruction at a privileged level; and
a dynamic random access memory (DRAM) coupled to the multi-core processor.

18. The system of claim 17, wherein the persistent user-level thread is to be suspended when the persistent user-level thread encounters an event to be handled by an operating system, and a service thread to run on the another operating-system-visible core is to imitate the suspended persistent user-level thread to provide operating system services to the suspended persistent user-level thread.

19. The system of claim 18, wherein the system is to:
cause the service thread to access an execution state of the persistent user-level thread through a common shared virtual address space;
provide a proxy execution to the persistent user-level thread; and
return a post execution state to the persistent user-level thread, wherein the persistent user-level thread is to resume from the post execution state.

20. The system of claim 17, wherein the multi-core processor is to process instructions at a first rate in the operating-system-visible core and at a second rate in the operating-system-sequestered core.

* * * * *